(12) United States Patent
Brennan, III et al.

(10) Patent No.: US 8,150,271 B1
(45) Date of Patent: Apr. 3, 2012

(54) ACTIVE TUNING OF TEMPORAL DISPERSION IN AN ULTRASHORT PULSE LASER SYSTEM

(75) Inventors: James Francis Brennan, III, Winter Park, FL (US); Laurent Vaissié, Oviedo, FL (US); Michael Marshall Mielke, Orlando, FL (US)

(73) Assignee: Raydiance, Inc., Petaluma, CA (US)

( * ) Notice: Subject to any disclaimer, the term of this patent is extended or adjusted under 35 U.S.C. 154(b) by 0 days.

(21) Appl. No.: 12/887,025

(22) Filed: Sep. 21, 2010

Related U.S. Application Data

(63) Continuation of application No. 11/391,936, filed on Mar. 28, 2006, now Pat. No. 7,822,347.

(51) Int. Cl.
*H04B 10/04* (2006.01)
(52) U.S. Cl. .......... 398/193; 398/189; 398/199
(58) Field of Classification Search .......... 398/182, 398/189–191, 199–201, 193
See application file for complete search history.

(56) References Cited

U.S. PATENT DOCUMENTS

| | | | |
|---|---|---|---|
| 2,436,662 A | 2/1948 | Norgaard |
| 3,459,960 A | 8/1969 | Aaland et al. |
| 3,549,256 A | 12/1970 | Brienza et al. |
| 3,599,019 A | 8/1971 | Nannichi et al. |
| 3,602,836 A | 8/1971 | Young |
| 3,622,907 A | 11/1971 | Tomlinson et al. |
| 3,626,318 A | 12/1971 | Young |
| 3,628,179 A | 12/1971 | Cuff |
| 3,631,362 A | 12/1971 | Almasi et al. |
| 3,646,469 A | 2/1972 | Buczek et al. |
| 3,654,624 A | 4/1972 | Becker et al. |
| 3,696,308 A | 10/1972 | Duffy et al. |
| 3,735,282 A | 5/1973 | Gans |
| 3,806,829 A | 4/1974 | Duston et al. |
| 3,808,549 A | 4/1974 | Maurer |
| 3,851,267 A | 11/1974 | Tanner |
| 3,942,127 A | 3/1976 | Fluhr et al. |
| 3,963,953 A | 6/1976 | Thornton, Jr. |
| 4,061,427 A | 12/1977 | Fletcher et al. |
| 4,194,813 A | 3/1980 | Benjamin et al. |
| 4,289,378 A | 9/1981 | Remy et al. |
| 4,389,617 A | 6/1983 | Kurnit |

(Continued)

FOREIGN PATENT DOCUMENTS

EP 214100 A 3/1987

(Continued)

OTHER PUBLICATIONS

Stock et al., "Chirped Pulse Amplification in an Erbium-doped Diber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.

(Continued)

*Primary Examiner* — Dzung Tran
(74) *Attorney, Agent, or Firm* — Carr & Ferrell LLP

(57) ABSTRACT

A chirped pulse amplification (CPA) system and method is described wherein the dispersion of the system is tuned by actively tuning one or more system components, for example, using a temperature or strain gradient, or using actinic radiation. In other embodiments, an additional element, such as a modulator, is added to the CPA system to actively to tune the pulse. A pulse monitor is added to the system to measure an output pulse and provide feedback to one or more active tuning elements.

28 Claims, 5 Drawing Sheets

U.S. PATENT DOCUMENTS

| | | |
|---|---|---|
| 4,394,623 A | 7/1983 | Kurnit |
| 4,590,598 A | 5/1986 | O'Harra, II |
| 4,622,095 A | 11/1986 | Grobman et al. |
| 4,655,547 A | 4/1987 | Heritage et al. |
| 4,673,795 A | 6/1987 | Ortiz, Jr. |
| 4,718,418 A | 1/1988 | L'Esperance, Jr. |
| 4,722,591 A | 2/1988 | Haffner |
| 4,730,113 A | 3/1988 | Edwards et al. |
| 4,750,809 A | 6/1988 | Kafka et al. |
| 4,808,000 A | 2/1989 | Pasciak |
| 4,815,079 A | 3/1989 | Snitzer et al. |
| 4,824,598 A | 4/1989 | Stokowski |
| 4,827,125 A | 5/1989 | Goldstein |
| 4,829,529 A | 5/1989 | Kafka |
| 4,835,670 A | 5/1989 | Adams et al. |
| 4,847,846 A | 7/1989 | Sone et al. |
| 4,848,340 A | 7/1989 | Bille et al. |
| 4,849,036 A | 7/1989 | Powell et al. |
| 4,856,011 A | 8/1989 | Shimada et al. |
| 4,902,127 A | 2/1990 | Byer et al. |
| 4,907,586 A | 3/1990 | Bille et al. |
| 4,913,520 A | 4/1990 | Kafka |
| 4,915,757 A | 4/1990 | Rando |
| 4,928,316 A | 5/1990 | Heritage et al. |
| 4,947,398 A | 8/1990 | Yasuda et al. |
| 4,950,268 A | 8/1990 | Rink |
| 4,972,423 A | 11/1990 | Alfano et al. |
| 4,983,034 A | 1/1991 | Spillman, Jr. |
| 4,988,348 A | 1/1991 | Bille |
| 4,994,059 A | 2/1991 | Kosa et al. |
| 5,010,555 A | 4/1991 | Madey et al. |
| 5,014,290 A | 5/1991 | Moore et al. |
| 5,022,042 A | 6/1991 | Bradley |
| 5,031,236 A | 7/1991 | Hodgkinson et al. |
| 5,043,991 A | 8/1991 | Bradley |
| 5,053,171 A | 10/1991 | Portney et al. |
| 5,095,487 A | 3/1992 | Meyerhofer et al. |
| 5,098,426 A | 3/1992 | Sklar et al. |
| 5,122,439 A | 6/1992 | Miersch et al. |
| 5,132,996 A | 7/1992 | Moore et al. |
| 5,146,088 A | 9/1992 | Kingham et al. |
| 5,154,707 A | 10/1992 | Rink et al. |
| 5,159,402 A | 10/1992 | Ortiz, Jr. |
| 5,162,643 A | 11/1992 | Currie |
| 5,166,818 A | 11/1992 | Chase et al. |
| 5,187,759 A | 2/1993 | DiGiovanni et al. |
| 5,204,867 A | 4/1993 | Koschmann |
| 5,206,455 A | 4/1993 | Williams et al. |
| 5,217,003 A | 6/1993 | Wilk |
| 5,233,182 A | 8/1993 | Szabo et al. |
| 5,237,576 A | 8/1993 | DiGiovanni et al. |
| 5,255,117 A | 10/1993 | Cushman |
| 5,257,273 A | 10/1993 | Farries et al. |
| 5,265,107 A | 11/1993 | Delfyett, Jr. |
| 5,267,077 A | 11/1993 | Blonder |
| 5,278,853 A | 1/1994 | Shirai et al. |
| 5,291,501 A | 3/1994 | Hanna |
| 5,293,186 A | 3/1994 | Seden et al. |
| 5,301,347 A | 4/1994 | Kensky |
| 5,302,835 A | 4/1994 | Bendett et al. |
| 5,309,453 A | 5/1994 | Treacy |
| 5,313,262 A | 5/1994 | Leonard |
| 5,315,431 A | 5/1994 | Masuda et al. |
| 5,315,436 A | 5/1994 | Lowenhar et al. |
| 5,329,398 A | 7/1994 | Lai et al. |
| 5,331,131 A | 7/1994 | Opdyke |
| 5,355,383 A | 10/1994 | Lockard |
| 5,367,143 A | 11/1994 | White, Jr. |
| 5,400,350 A | 3/1995 | Galvanauskas |
| 5,409,376 A | 4/1995 | Murphy |
| 5,411,918 A | 5/1995 | Keible et al. |
| 5,414,725 A | 5/1995 | Fermann et al. |
| 5,418,809 A | 5/1995 | August, Jr. et al. |
| 5,428,471 A | 6/1995 | McDermott |
| 5,430,572 A | 7/1995 | DiGiovanni et al. |
| 5,440,573 A | 8/1995 | Fermann |
| 5,446,813 A | 8/1995 | Lee et al. |
| 5,450,427 A | 9/1995 | Fermann et al. |
| 5,479,422 A | 12/1995 | Fermann et al. |
| 5,489,984 A | 2/1996 | Hariharan et al. |
| 5,493,579 A | 2/1996 | Ressl et al. |
| 5,499,134 A | 3/1996 | Galvanauskas et al. |
| 5,517,043 A | 5/1996 | Ma et al. |
| 5,520,679 A | 5/1996 | Lin |
| 5,548,098 A | 8/1996 | Sugawara et al. |
| 5,572,335 A | 11/1996 | Stevens |
| 5,572,358 A | 11/1996 | Gabl et al. |
| 5,585,642 A | 12/1996 | Britton et al. |
| 5,585,652 A | 12/1996 | Kamasz et al. |
| 5,585,913 A | 12/1996 | Hariharan et al. |
| 5,590,142 A | 12/1996 | Shan |
| 5,592,327 A | 1/1997 | Gabl et al. |
| 5,596,668 A | 1/1997 | DiGiovanni et al. |
| 5,602,673 A | 2/1997 | Swan |
| 5,602,677 A | 2/1997 | Tournois |
| 5,615,043 A | 3/1997 | Plaessmann et al. |
| 5,617,434 A | 4/1997 | Tamura et al. |
| 5,624,587 A | 4/1997 | Otsuki et al. |
| 5,625,544 A | 4/1997 | Kowshik et al. |
| 5,627,848 A | 5/1997 | Fermann et al. |
| 5,631,771 A | 5/1997 | Swan |
| 5,633,750 A | 5/1997 | Nogiwa et al. |
| 5,633,885 A | 5/1997 | Galvanauskas et al. |
| 5,642,447 A | 6/1997 | Pan et al. |
| 5,644,424 A | 7/1997 | Backus et al. |
| 5,651,018 A | 7/1997 | Mehuys et al. |
| 5,656,186 A | 8/1997 | Mourou et al. |
| 5,657,153 A | 8/1997 | Endriz et al. |
| 5,661,829 A | 8/1997 | Zheng |
| 5,663,731 A | 9/1997 | Theodoras, II et al. |
| 5,665,942 A | 9/1997 | Williams et al. |
| 5,666,722 A | 9/1997 | Tamm et al. |
| 5,670,067 A | 9/1997 | Koide et al. |
| 5,677,769 A | 10/1997 | Bendett |
| 5,689,361 A | 11/1997 | Damen et al. |
| 5,689,519 A | 11/1997 | Fermann et al. |
| 5,694,501 A | 12/1997 | Alavie et al. |
| 5,696,782 A | 12/1997 | Harter et al. |
| 5,701,319 A | 12/1997 | Fermann |
| 5,703,639 A | 12/1997 | Farrier et al. |
| 5,708,669 A | 1/1998 | DiGiovanni et al. |
| 5,710,424 A | 1/1998 | Theodoras, II et al. |
| 5,720,894 A | 2/1998 | Neev et al. |
| 5,726,855 A | 3/1998 | Mourou et al. |
| 5,734,762 A | 3/1998 | Ho et al. |
| 5,736,709 A | 4/1998 | Neiheisel |
| 5,739,933 A * | 4/1998 | Dembeck et al. ............... 398/45 |
| 5,770,864 A | 6/1998 | Dlugos |
| 5,771,253 A | 6/1998 | Chang-Hasnain et al. |
| 5,778,016 A | 7/1998 | Sucha et al. |
| 5,781,289 A | 7/1998 | Sabsabi et al. |
| 5,788,688 A | 8/1998 | Bauer et al. |
| 5,790,574 A | 8/1998 | Rieger et al. |
| 5,815,519 A | 9/1998 | Aoshima et al. |
| 5,818,630 A | 10/1998 | Fermann et al. |
| 5,822,097 A | 10/1998 | Tournois |
| 5,844,149 A | 12/1998 | Akiyoshi et al. |
| 5,847,825 A | 12/1998 | Alexander |
| 5,847,863 A | 12/1998 | Galvanauskas et al. |
| 5,862,287 A | 1/1999 | Stock et al. |
| 5,862,845 A | 1/1999 | Chin et al. |
| 5,867,304 A | 2/1999 | Galvanauskas et al. |
| 5,875,408 A | 2/1999 | Bendett et al. |
| 5,880,823 A | 3/1999 | Lu |
| 5,880,877 A | 3/1999 | Fermann et al. |
| 5,898,485 A | 4/1999 | Nati, Jr. |
| 5,907,157 A | 5/1999 | Yoshioka et al. |
| 5,920,668 A | 7/1999 | Uehara et al. |
| 5,923,686 A | 7/1999 | Fermann et al. |
| 5,929,430 A | 7/1999 | Yao et al. |
| 5,936,716 A | 8/1999 | Pinsukanjana et al. |
| 5,999,847 A | 12/1999 | Elstrom |
| 6,014,249 A | 1/2000 | Fermann et al. |
| 6,016,452 A | 1/2000 | Kasevich |
| 6,020,591 A | 2/2000 | Harter et al. |
| 6,034,975 A | 3/2000 | Harter et al. |
| 6,041,020 A | 3/2000 | Caron et al. |

| | | |
|---|---|---|
| 6,061,373 A | 5/2000 | Brockman et al. |
| 6,071,276 A | 6/2000 | Abela |
| 6,072,811 A | 6/2000 | Fermann et al. |
| 6,075,588 A | 6/2000 | Pinsukanjana et al. |
| 6,081,369 A | 6/2000 | Waarts et al. |
| 6,088,153 A | 7/2000 | Anthon et al. |
| 6,099,522 A | 8/2000 | Knopp et al. |
| 6,120,857 A | 9/2000 | Balooch et al. |
| 6,122,097 A | 9/2000 | Weston et al. |
| 6,130,780 A | 10/2000 | Joannopoulos et al. |
| 6,134,003 A | 10/2000 | Tearney et al. |
| 6,141,140 A | 10/2000 | Kim |
| 6,151,338 A | 11/2000 | Grubb et al. |
| 6,154,310 A | 11/2000 | Galvanauskas et al. |
| 6,156,030 A | 12/2000 | Neev |
| 6,161,543 A | 12/2000 | Cox et al. |
| 6,168,590 B1 | 1/2001 | Neev |
| 6,172,611 B1 | 1/2001 | Hussain et al. |
| 6,175,437 B1 | 1/2001 | Diels et al. |
| 6,179,421 B1 | 1/2001 | Pang |
| 6,181,463 B1 | 1/2001 | Galvanauskas et al. |
| 6,190,380 B1 | 2/2001 | Abela |
| 6,198,568 B1 | 3/2001 | Galvanauskas et al. |
| 6,198,766 B1 | 3/2001 | Schuppe et al. |
| 6,201,914 B1 | 3/2001 | Duguay et al. |
| 6,208,458 B1 | 3/2001 | Galvanauskas et al. |
| 6,246,816 B1 | 6/2001 | Moore et al. |
| 6,249,630 B1 | 6/2001 | Stock et al. |
| 6,252,892 B1 | 6/2001 | Jiang et al. |
| 6,256,328 B1 | 7/2001 | Delfyett et al. |
| 6,269,108 B1 | 7/2001 | Tabirian et al. |
| 6,271,650 B1 | 8/2001 | Massie et al. |
| 6,275,250 B1 | 8/2001 | Sanders et al. |
| 6,275,512 B1 | 8/2001 | Fermann |
| 6,281,471 B1 | 8/2001 | Smart |
| 6,290,910 B1 | 9/2001 | Chalk |
| 6,303,903 B1 | 10/2001 | Liu |
| 6,314,115 B1 | 11/2001 | Delfyett et al. |
| 6,325,792 B1 | 12/2001 | Swinger et al. |
| 6,327,074 B1 | 12/2001 | Bass et al. |
| 6,327,282 B2 | 12/2001 | Hammons et al. |
| 6,330,383 B1 | 12/2001 | Cai et al. |
| 6,334,011 B1 | 12/2001 | Galvanauskas et al. |
| 6,335,821 B1 | 1/2002 | Suzuki et al. |
| 6,340,806 B1 | 1/2002 | Smart et al. |
| RE37,585 E | 3/2002 | Mourou et al. |
| 6,355,908 B1 | 3/2002 | Tatah et al. |
| 6,359,681 B1 | 3/2002 | Housand et al. |
| 6,362,454 B1 | 3/2002 | Liu |
| 6,365,869 B1 | 4/2002 | Swain et al. |
| 6,366,395 B1 | 4/2002 | Drake et al. |
| 6,370,171 B1 | 4/2002 | Horn et al. |
| 6,370,422 B1 | 4/2002 | Richards-Kortum et al. |
| 6,396,317 B1 | 5/2002 | Roller et al. |
| 6,400,871 B1 | 6/2002 | Minden |
| 6,404,944 B1 | 6/2002 | Wa et al. |
| 6,407,363 B2 | 6/2002 | Dunsky et al. |
| 6,418,154 B1 | 7/2002 | Kneip et al. |
| 6,418,256 B1 | 7/2002 | Danziger et al. |
| 6,421,169 B1 | 7/2002 | Bonnedal et al. |
| 6,433,303 B1 | 8/2002 | Liu et al. |
| 6,433,305 B1 | 8/2002 | Liu et al. |
| 6,433,760 B1 | 8/2002 | Vaissie et al. |
| 6,463,314 B1 | 10/2002 | Haruna |
| 6,482,199 B1 | 11/2002 | Neev |
| 6,485,413 B1 | 11/2002 | Boppart et al. |
| 6,486,435 B1 | 11/2002 | Beyer et al. |
| 6,496,099 B2 | 12/2002 | Wang et al. |
| 6,501,590 B2 | 12/2002 | Bass et al. |
| 6,522,460 B2 | 2/2003 | Bonnedal et al. |
| 6,522,674 B1 | 2/2003 | Niwano et al. |
| 6,525,873 B2 | 2/2003 | Gerrish et al. |
| 6,526,085 B2 | 2/2003 | Vogler et al. |
| 6,526,327 B2 | 2/2003 | Kar et al. |
| 6,529,319 B2 | 3/2003 | Youn et al. |
| 6,541,731 B2 | 4/2003 | Mead et al. |
| 6,547,453 B1 | 4/2003 | Stummer et al. |
| 6,549,547 B2 | 4/2003 | Galvanauskas et al. |
| 6,552,301 B2 | 4/2003 | Herman et al. |
| 6,555,781 B2 | 4/2003 | Ngoi et al. |
| 6,556,733 B2 | 4/2003 | Dy et al. |
| 6,567,431 B2 | 5/2003 | Tabirian et al. |
| 6,570,704 B2 | 5/2003 | Palese |
| 6,573,813 B1 | 6/2003 | Joannopoulos et al. |
| 6,574,024 B1 | 6/2003 | Liu |
| 6,574,250 B2 | 6/2003 | Sun et al. |
| 6,576,917 B1 | 6/2003 | Silfvast |
| 6,580,553 B2 | 6/2003 | Kim et al. |
| 6,587,488 B1 | 7/2003 | Meissner et al. |
| 6,597,497 B2 | 7/2003 | Wang et al. |
| 6,603,903 B1 | 8/2003 | Tong et al. |
| 6,603,911 B2 | 8/2003 | Fink et al. |
| 6,621,040 B1 | 9/2003 | Perry et al. |
| 6,621,045 B1 | 9/2003 | Liu et al. |
| 6,627,421 B1 | 9/2003 | Unger et al. |
| 6,627,844 B2 | 9/2003 | Liu et al. |
| 6,642,477 B1 | 11/2003 | Patel et al. |
| 6,647,031 B2 | 11/2003 | Delfyett et al. |
| 6,654,161 B2 | 11/2003 | Bass et al. |
| 6,661,816 B2 | 12/2003 | Delfyett et al. |
| 6,661,820 B1 | 12/2003 | Camilleri et al. |
| 6,671,298 B1 | 12/2003 | Delfyett et al. |
| 6,677,552 B1 | 1/2004 | Tulloch et al. |
| 6,681,079 B1 | 1/2004 | Maroney |
| 6,690,686 B2 | 2/2004 | Delfyett et al. |
| 6,695,835 B2 | 2/2004 | Furuno et al. |
| 6,696,008 B2 | 2/2004 | Brandinger |
| 6,697,402 B2 | 2/2004 | Crawford |
| 6,697,408 B2 | 2/2004 | Kennedy et al. |
| 6,700,094 B1 | 3/2004 | Kuntze |
| 6,700,698 B1 | 3/2004 | Scott |
| 6,706,036 B2 | 3/2004 | Lai |
| 6,706,998 B2 | 3/2004 | Cutler |
| 6,710,288 B2 | 3/2004 | Liu et al. |
| 6,710,293 B2 | 3/2004 | Liu et al. |
| 6,711,334 B2 | 3/2004 | Szkopek et al. |
| 6,716,475 B1 | 4/2004 | Fink et al. |
| 6,720,519 B2 | 4/2004 | Liu et al. |
| 6,723,991 B1 | 4/2004 | Sucha et al. |
| 6,727,458 B2 | 4/2004 | Smart |
| 6,728,273 B2 | 4/2004 | Perry |
| 6,728,439 B2 | 4/2004 | Weisberg et al. |
| 6,735,229 B1 | 5/2004 | Delfyett et al. |
| 6,735,368 B2 | 5/2004 | Parker et al. |
| 6,738,144 B1 | 5/2004 | Dogariu |
| 6,738,408 B2 | 5/2004 | Abedin |
| 6,744,555 B2 | 6/2004 | Galvanauskas et al. |
| 6,747,795 B2 | 6/2004 | Lin et al. |
| 6,749,285 B2 | 6/2004 | Liu et al. |
| 6,760,356 B2 | 7/2004 | Erbert et al. |
| 6,774,869 B2 | 8/2004 | Biocca et al. |
| 6,782,207 B1 | 8/2004 | Efimov |
| 6,785,303 B1 | 8/2004 | Holzwarth et al. |
| 6,785,445 B2 | 8/2004 | Kuroda et al. |
| 6,787,733 B2 | 9/2004 | Lubatschowski et al. |
| 6,787,734 B2 | 9/2004 | Liu |
| 6,788,864 B2 | 9/2004 | Ahmad et al. |
| 6,791,060 B2 | 9/2004 | Dunsky et al. |
| 6,791,071 B2 | 9/2004 | Woo et al. |
| 6,795,461 B1 | 9/2004 | Blair et al. |
| 6,801,550 B1 | 10/2004 | Snell et al. |
| 6,801,551 B1 | 10/2004 | Delfyett et al. |
| 6,801,557 B2 | 10/2004 | Liu |
| 6,803,539 B2 | 10/2004 | Liu et al. |
| 6,804,574 B2 | 10/2004 | Liu et al. |
| 6,807,353 B1 | 10/2004 | Fleming et al. |
| 6,807,375 B2 | 10/2004 | Dogariu |
| 6,815,638 B2 | 11/2004 | Liu |
| 6,819,694 B2 | 11/2004 | Jiang et al. |
| 6,819,702 B2 | 11/2004 | Sverdlov et al. |
| 6,819,837 B2 | 11/2004 | Li et al. |
| 6,822,251 B1 | 11/2004 | Arenberg et al. |
| 6,824,540 B1 | 11/2004 | Lin |
| 6,829,517 B2 | 12/2004 | Cheng et al. |
| 6,834,134 B2 | 12/2004 | Brennan, III et al. |
| 6,836,703 B2 | 12/2004 | Wang et al. |
| 6,878,900 B2 | 4/2005 | Corkum et al. |
| 6,882,772 B1 | 4/2005 | Lowery et al. |

| Patent/Pub No. | Date | Name |
|---|---|---|
| 6,885,683 B1 | 4/2005 | Fermann et al. |
| 6,887,804 B2 | 5/2005 | Sun et al. |
| 6,897,405 B2 | 5/2005 | Cheng et al. |
| 6,902,561 B2 | 6/2005 | Kurtz et al. |
| 6,917,631 B2 | 7/2005 | Richardson et al. |
| 6,928,490 B1 | 8/2005 | Bucholz et al. |
| 6,937,629 B2 | 8/2005 | Perry et al. |
| 6,943,359 B2 | 9/2005 | Vardeny et al. |
| 6,956,680 B2 | 10/2005 | Morbieu et al. |
| 6,994,703 B2 | 2/2006 | Wang et al. |
| 7,002,733 B2 | 2/2006 | Dagenais et al. |
| 7,006,730 B2 | 2/2006 | Doerr |
| 7,022,119 B2 | 4/2006 | Hohla |
| 7,031,571 B2 | 4/2006 | Mihailov et al. |
| 7,068,408 B2 | 6/2006 | Sakai |
| 7,072,101 B2 | 7/2006 | Kapteyn et al. |
| 7,088,756 B2 | 8/2006 | Fermann et al. |
| 7,095,772 B1 * | 8/2006 | Delfyett et al. ............ 372/50.22 |
| 7,097,640 B2 | 8/2006 | Wang et al. |
| 7,099,549 B2 | 8/2006 | Scheuer et al. |
| 7,116,688 B2 | 10/2006 | Sauter et al. |
| 7,132,289 B2 | 11/2006 | Kobayashi et al. |
| 7,143,769 B2 | 12/2006 | Stoltz et al. |
| 7,171,074 B2 | 1/2007 | DiGiovanni et al. |
| 7,217,266 B2 | 5/2007 | Anderson et al. |
| 7,220,255 B2 | 5/2007 | Lai |
| 7,233,607 B2 | 6/2007 | Richardson et al. |
| 7,257,302 B2 | 8/2007 | Fermann et al. |
| 7,289,707 B1 | 10/2007 | Chavez-Pirson et al. |
| 7,321,605 B2 | 1/2008 | Albert |
| 7,321,713 B2 | 1/2008 | Akiyama et al. |
| 7,332,234 B2 | 2/2008 | Levinson et al. |
| 7,349,452 B2 | 3/2008 | Brennan, III et al. |
| 7,361,171 B2 | 4/2008 | Stoltz et al. |
| 7,367,969 B2 | 5/2008 | Stoltz et al. |
| 7,413,565 B2 | 8/2008 | Wang et al. |
| 7,444,049 B1 | 10/2008 | Kim et al. |
| 7,505,196 B2 | 3/2009 | Nati et al. |
| 7,518,788 B2 | 4/2009 | Fermann et al. |
| 7,584,756 B2 | 9/2009 | Zadoyan et al. |
| 7,728,967 B2 | 6/2010 | Ochiai et al. |
| 7,773,294 B2 | 8/2010 | Brunet et al. |
| 7,787,175 B1 | 8/2010 | Brennan, III et al. |
| 7,822,347 B1 * | 10/2010 | Brennan, III et al. ................ 398/193 |
| 7,963,958 B2 | 6/2011 | Stoltz et al. |
| 2001/0009250 A1 | 7/2001 | Herman et al. |
| 2001/0021294 A1 | 9/2001 | Cai et al. |
| 2001/0046243 A1 | 11/2001 | Schie |
| 2002/0003130 A1 | 1/2002 | Sun et al. |
| 2002/0051606 A1 | 5/2002 | Takushima et al. |
| 2002/0071454 A1 | 6/2002 | Lin |
| 2002/0091325 A1 | 7/2002 | Ostrovsky |
| 2002/0095142 A1 | 7/2002 | Ming |
| 2002/0097468 A1 | 7/2002 | Mecherle et al. |
| 2002/0097761 A1 | 7/2002 | Sucha et al. |
| 2002/0118934 A1 | 8/2002 | Danziger et al. |
| 2002/0153500 A1 | 10/2002 | Fordahl et al. |
| 2002/0167581 A1 | 11/2002 | Cordingley et al. |
| 2002/0167974 A1 | 11/2002 | Kennedy et al. |
| 2002/0176676 A1 | 11/2002 | Johnson et al. |
| 2002/0186915 A1 | 12/2002 | Yu et al. |
| 2002/0191901 A1 | 12/2002 | Jensen |
| 2003/0011782 A1 | 1/2003 | Tanno |
| 2003/0031410 A1 | 2/2003 | Schnitzer |
| 2003/0039442 A1 | 2/2003 | Bond et al. |
| 2003/0053508 A1 | 3/2003 | Dane et al. |
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0095266 A1 | 5/2003 | Detalle et al. |
| 2003/0123496 A1 | 7/2003 | Broutin et al. |
| 2003/0142705 A1 | 7/2003 | Hackel et al. |
| 2003/0156605 A1 | 8/2003 | Richardson et al. |
| 2003/0161365 A1 | 8/2003 | Perry et al. |
| 2003/0161378 A1 | 8/2003 | Zhang et al. |
| 2003/0178396 A1 | 9/2003 | Naumov et al. |
| 2003/0202547 A1 | 10/2003 | Fermann et al. |
| 2003/0205561 A1 | 11/2003 | Iso |
| 2003/0214714 A1 | 11/2003 | Zheng |
| 2003/0223689 A1 | 12/2003 | Koch et al. |
| 2003/0235381 A1 | 12/2003 | Hunt |
| 2004/0000942 A1 | 1/2004 | Kapteyn et al. |
| 2004/0037505 A1 | 2/2004 | Morin |
| 2004/0042061 A1 | 3/2004 | Islam et al. |
| 2004/0049552 A1 | 3/2004 | Motoyama et al. |
| 2004/0101001 A1 | 5/2004 | Bergmann et al. |
| 2004/0128081 A1 | 7/2004 | Rabitz et al. |
| 2004/0134894 A1 | 7/2004 | Gu et al. |
| 2004/0134896 A1 | 7/2004 | Gu et al. |
| 2004/0160995 A1 | 8/2004 | Sauter et al. |
| 2004/0226925 A1 | 11/2004 | Gu et al. |
| 2004/0231682 A1 | 11/2004 | Stoltz et al. |
| 2004/0233944 A1 | 11/2004 | Dantus et al. |
| 2004/0263950 A1 | 12/2004 | Fermann et al. |
| 2005/0008044 A1 | 1/2005 | Fermann et al. |
| 2005/0018986 A1 | 1/2005 | Argyros et al. |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0067388 A1 | 3/2005 | Sun et al. |
| 2005/0074974 A1 | 4/2005 | Stoltz |
| 2005/0077275 A1 | 4/2005 | Stoltz |
| 2005/0105865 A1 | 5/2005 | Fermann et al. |
| 2005/0107773 A1 | 5/2005 | Bergt et al. |
| 2005/0111073 A1 | 5/2005 | Pan et al. |
| 2005/0111500 A1 | 5/2005 | Harter et al. |
| 2005/0127049 A1 | 6/2005 | Woeste et al. |
| 2005/0154380 A1 | 7/2005 | DeBenedictis et al. |
| 2005/0163426 A1 | 7/2005 | Fermann et al. |
| 2005/0167405 A1 | 8/2005 | Stoltz et al. |
| 2005/0171516 A1 | 8/2005 | Stoltz et al. |
| 2005/0171518 A1 | 8/2005 | Stoltz et al. |
| 2005/0175280 A1 | 8/2005 | Nicholson |
| 2005/0177143 A1 | 8/2005 | Bullington et al. |
| 2005/0195726 A1 | 9/2005 | Bullington et al. |
| 2005/0213630 A1 | 9/2005 | Mielke et al. |
| 2005/0215985 A1 | 9/2005 | Mielke et al. |
| 2005/0218122 A1 | 10/2005 | Yamamoto et al. |
| 2005/0225846 A1 | 10/2005 | Nati et al. |
| 2005/0226278 A1 * | 10/2005 | Gu et al. ........................ 372/6 |
| 2005/0226286 A1 | 10/2005 | Liu et al. |
| 2005/0226287 A1 | 10/2005 | Shah et al. |
| 2005/0232560 A1 | 10/2005 | Knight et al. |
| 2005/0238070 A1 | 10/2005 | Imeshev et al. |
| 2005/0253482 A1 | 11/2005 | Kapps et al. |
| 2005/0259944 A1 | 11/2005 | Anderson et al. |
| 2005/0265407 A1 | 12/2005 | Braun et al. |
| 2005/0271094 A1 | 12/2005 | Miller et al. |
| 2005/0271340 A1 | 12/2005 | Weisberg et al. |
| 2006/0016891 A1 | 1/2006 | Giebel et al. |
| 2006/0030951 A1 | 2/2006 | Davlin et al. |
| 2006/0050750 A1 | 3/2006 | Barty |
| 2006/0056480 A1 | 3/2006 | Mielke et al. |
| 2006/0064079 A1 | 3/2006 | Stoltz et al. |
| 2006/0067604 A1 | 3/2006 | Bull et al. |
| 2006/0084957 A1 | 4/2006 | Delfyett et al. |
| 2006/0093012 A1 | 5/2006 | Singh et al. |
| 2006/0093265 A1 | 5/2006 | Jia et al. |
| 2006/0120418 A1 * | 6/2006 | Harter et al. .................... 372/30 |
| 2006/0126679 A1 | 6/2006 | Brennan et al. |
| 2006/0131288 A1 | 6/2006 | Sun et al. |
| 2006/0187974 A1 | 8/2006 | Dantus |
| 2006/0209908 A1 | 9/2006 | Pedersen et al. |
| 2006/0210275 A1 | 9/2006 | Vaissie et al. |
| 2006/0221449 A1 | 10/2006 | Glebov et al. |
| 2006/0250025 A1 | 11/2006 | Kitagawa et al. |
| 2006/0268949 A1 | 11/2006 | Gohle et al. |
| 2007/0025728 A1 | 2/2007 | Nakazawa et al. |
| 2007/0047965 A1 | 3/2007 | Liu et al. |
| 2007/0064304 A1 | 3/2007 | Brennan III |
| 2007/0098025 A1 | 5/2007 | Hong et al. |
| 2007/0106416 A1 | 5/2007 | Griffiths et al. |
| 2007/0121686 A1 | 5/2007 | Vaissie et al. |
| 2007/0196048 A1 | 8/2007 | Galvanauskas et al. |
| 2007/0229939 A1 | 10/2007 | Brown et al. |
| 2007/0253455 A1 | 11/2007 | Stadler et al. |

| | | | |
|---|---|---|---|
| 2007/0273960 | A1 | 11/2007 | Fermann et al. |
| 2008/0232407 | A1 | 9/2008 | Harter et al. |
| 2008/0240184 | A1 | 10/2008 | Cho et al. |
| 2009/0219610 | A1 | 9/2009 | Mourou et al. |
| 2009/0244695 | A1 | 10/2009 | Marcinkevicius et al. |
| 2009/0245302 | A1 | 10/2009 | Baird et al. |
| 2009/0257464 | A1 | 10/2009 | Dantus et al. |
| 2009/0273828 | A1 | 11/2009 | Waarts et al. |
| 2009/0297155 | A1 | 12/2009 | Weiner et al. |
| 2010/0040095 | A1 | 2/2010 | Mielke et al. |
| 2010/0118899 | A1 | 5/2010 | Peng et al. |
| 2010/0142034 | A1 | 6/2010 | Wise et al. |

FOREIGN PATENT DOCUMENTS

| | | |
|---|---|---|
| EP | 691563 A2 | 1/1996 |
| EP | 1462831 A1 | 9/2004 |
| JP | 8171103 | 7/1996 |
| JP | 11189472 A | 7/1999 |
| JP | 2003181661 A | 7/2003 |
| JP | 2003344883 | 12/2003 |
| JP | 2005174993 | 6/2005 |
| WO | W09428972 A1 | 12/1994 |
| WO | WO2004105100 A2 | 12/2004 |
| WO | WO2004114473 A2 | 12/2004 |
| WO | WO2005018060 A2 | 2/2005 |
| WO | WO2005018061 A2 | 2/2005 |
| WO | WO2005018062 A2 | 2/2005 |
| WO | WO2005018063 A2 | 2/2005 |
| WO | WO2007034317 A2 | 3/2007 |

OTHER PUBLICATIONS

Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 11, 1985.

Temelkuran, B. et al., "Wavelength-scalable Hollow Optical Fibres with Large Photonic Bandgaps for CO2 Laser Transmission," Nature, Dec. 12, 2002, pp. 650-653.

Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.

Weiner, A.M. et al., "Synthesis of Phase-coherent, Picosecond Optical Square Pulses," Optics Letters, vol. 11, No. 3, pp. 153-155, Mar. 1986.

Weiner, A.M., "Femtosecond Optical Pulse Shaping and Processing," Prog. Quant. Electr. 1995, vol. 19, pp. 161-237, 1995.

Weiner, A.M., "High-resolution femtosecond Pulse Shaping," Journal of the Optical Society of America B. vol. 5, No. 8, pp. 1563-1572, Aug. 1988.

Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).

White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.

Yamakawa et al., "1 Hz, 1 ps, terawatt Nd: glass laser," Optics Communications, North-Holland Publishing Co. Amsterdam, NL, vol. 112, No. 1-2, Nov. 1, 1994, pp. 37-42, XP024424285.

Yan et al., Ultrashort Pulse Measurement Using Interferometric Autocorrelator Based on Two-photon-absorbtion Detector at 1.55pm Wavelength Region., 2005, Proceedings of SPIE vol. 5633, Advanced Materials and Devices for Sensing and Imaging II, pp. 424-429.

Yeh, et al. "Theory of Bragg Fiber," Journal of the Optical Society America, Sep. 1978, pp. 1196, vol. 68, No. 9., pp. 1196-1201.

Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.

Yi, Y., et al., "On-chip Si-based Bragg Cladding Waveguide with High Index Contrast Bilayers", Optics Express, vol. 12, No. 20, Oct. 4, 2004, pp. 4775-4780.

Yin, D. et al., "Integrated ARROW Waveguides with Hollow Cores", Optics Express, vol. 12, No. 12, Jun. 14, 2004, pp. 2710-2715.

Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.

Agostinelli, J. et al., "Optical Pulse Shaping with a Grating Pair," Applied Optics, vol. 18, No. 14, pp. 2500-2504, Jul. 15, 1979.

Anastassiou et al., "Photonic Bandgap Fibers Exploiting Omnidirectional Reflectivity Enable Flexible Delivery of Infrared Lasers for Tissue Cutting," Proceedings of the SPIE—The International Society for Optical Engineering, SPIE, US, vol. 5317, No. 1, Jan. 1, 2004, pp. 29-38, XP002425586 ISSN: 0277-786X.

Benoit, G. et al., "Dynamic All-optical Tuning of Transverse Resonant Cavity Modes in Photonic Bandgap Fibers, "Optics Letters, vol. 30, No. 13, Jul. 1, 2005, pp. 1620-1622.

Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.

Chen, X. et al., "Highly Birefringent Hollow-core Photonic Bandgap Fiber," Optics Express, vol. 12, No. 16, Aug. 9, 2004, pp. 3888-3893.

Chen, Y. et al., "Dispersion-Managed Mode Locking", Journal of the Optical Society of America B, Nov. 1999, pp. 1999-2004, vol. 16, No. 11, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

De Matos et al., "Multi-kilowatt, Picosecond Pulses from an All-fiber Chirped Pulse Amplification System Using Air-core Photonic Bandgalp Fiber,"Lasers and Electro-optics, 2004, (CLEO), Conference on San Francisco, CA USA, May 20-21, 2004, Piscataway, NJ, USA, IEEE, vol. May 17, 2004, pp. 973-974, XP010745448 ISBN: 978-1-55752-777-6.

De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.

Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Eggleton, et al., "Electrically Tunable Power Efficient Dispersion Compensating Fiber Bragg Grating," IEEE Photonics Technology Letters, vol., 11, No. 7, pp. 854-856, Jul. 1999.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Folkenberg, J.R., et al., "Broadband Single-polarization Photonic Crystal Fiber," Optics Letters, vol. 30, No. 12, Jun. 15, 2005, pp. 1446-1448.

Folkenberg, J.R., et al., "Polarization Maintaining Large Mode Area Photonic Crystal Fiber," Optics Express vol. 12, No. 5, Mar. 8, 2004, pp. 956-960.

Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.

Galvanauskas, A. et al., "Chirped-pulse-amplification Circuits for Fiber Amplifiers, Based on Chirped-period Quasi-phase, matching gratings", Optics Letters, Nov. 1, 1998, pp. 1695-1697, vol. 23, No. 21, Optical Society of America.

Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-7777.

Hellstrom, E. et al., "Third-order Dispersion Compensation Using a Phase Modulator", Journal of Lightwave Technology, vol. 21, No. 5, pp. 1188-1197, May 2003.

Heritage, J. P. et al., "Picosecond Pulse Shaping by Spectral Phase and Amplitude Manipulation," Optics Letters, vol. 10, No. 12, pp. 609-611, Dec. 1985.

Heritage, J.P. et al., "Spectral Windowing of Frequency-Modulated Optical Pulses in a Grating Compressor," Applied Physics Letters, vol. 47, No. 2, pp. 87-89, Jul. 15, 1985.

Hill, K. et al., "Fiber Bragg Grating Technology Fundamentals and Overview," Journal of Lightwave Technology, Aug. 1997, vol. 15, No. 8, pp. 1263-1276.

Ibanescu et al., "Analysis of Mode Structure in Hollow Dielctric Waveguide Fibers, "Physical Review E 67, 2003, The American Physical Society.

Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.

Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.

Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.

Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Koechner, "Solid State Laser Engineering", Oct. 29, 1999, Section 5.5, pp. 270-277, 5th Edition, Springer.

Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.

Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Levy et al., "Engineering Space-Variant Inhomogeneous Media for Polarization Control," Optics Letters, Aug. 1, 2004, pp. 1718-1720, vol. 29, No. 15, Optical Society of America.

Liao, K. et al., "Large-aperture Chirped Volume Bragg Grating Based Fiber CPA System," Optics Express, Apr. 16, 2007, vol. 15, No. 8, pp. 4876-4882.

Lo, S. et al., "Semiconductor Hollow Optical Waveguides Formed by Omni-directional Reflectors", Optics Express, vol. 12, No. 26, Dec. 27, 2004, pp. 6589-6593.

Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.

Mehier-Humbert, S. et al., "Physical Methods for Gene Transfer: Improving the Kinetics of Gene Delivery Into Cells," Advanced Drug Delivery Reviews, vol. 57, pp. 733-753, 2005.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.

Nicholson, J. et al., "Propagation of Femotsecond Pulses in Large-mode-area, Higher-order-mode Fiber," Optics Letters, vol. 31, No. 21, 2005, pp. 3191-3193.

Noda, J. et al., "Polarization-maintaining Fibers and Their Applications", Journal of Lightwave Technology, vol. Lt-4, No. 8 Aug. 1986, pp. 1071-1089.

Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.

Pelusi, M. D. et al., "Electrooptic Phase Modulation of Stretched 250-fs Pulses for Suppression of Third-Order Fiber Disperson in Transmission," IEEE Photonics Technology Letters, vol. 11, No. 11, pp. 1461-1463, Nov. 1999.

Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.

Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.

Price et al., "Advances in High Power, Short Pulse, Fiber Laser Systems and Technology", Photonics West 2005, San Jose, California, Jan. 2005, pp. 5709-3720.

Ramachandran, S., et al., "High-power Amplification in a 2040-µm2 Higher Order Mode," SPIE Photonics West 2007, Post-deadline.

Resan et al., "Dispersion-Managed Semiconductor Mode-Locked Ring Laser", Optics Letters, Aug. 1, 2003, pp. 1371-1373, vol. 28, No. 15, Optical Society of America.

Schreiber, T., et al., "Design and High Power Operation of a Stress-induced single Polarization Single-transverse Mode LMA Yb-doped Photonic Crystal Fiber," Fiber Lasers III: Technology, Systems, and Applications, Andrew J.W. Brown, Johan Nilsson, Donald J. Harter, Andreas Tünnermann, eds., Proc. of SPIE, vol. 6102, pp. 61020C-1-61020C-9, 2006.

Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

Siegman, "Unstable Optical Resonators", Applied Optics, Feb. 1974, pp. 353-367, vol. 13, No. 2.

Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.

* cited by examiner

ACTIVE TUNING OF TEMPORAL DISPERSION IN AN ULTRASHORT PULSE LASER SYSTEM

CROSS REFERENCE TO RELATED APPLICATIONS

The present application is a continuation and claims the priority benefit of U.S. patent application Ser. No. 11/391,936 filed Mar. 28, 2006 now U.S. Pat. No. 7,822,347, the disclosure of which is incorporated herein by reference.

BACKGROUND

1. Field of the Invention

The invention relates to laser systems and more specifically to actively tuning components in a laser system.

2. Related Art

Nearly all high peak power USP laser systems use the technique of chirped pulse amplification (CPA) to produce short-duration high-intensity pulses. Chirped pulse amplification increases the energy of a short pulse while avoiding optical amplifier damage. In this technique, the duration of the pulse is increased by dispersing it temporally as a function of wavelength (a process called "chirping"), amplifying the chirped pulse, and then recompressing the chirped pulse to significantly shorten its duration. By lengthening the pulse in time, energy can be efficiently extracted from an optical amplifier gain medium while the peak power levels of the pulse are below the damage threshold of the optical amplifier.

The dispersion in CPA laser systems can vary due to many factors. For instance, most CPA systems rely on Treacy compressors to reform pulses after they have been amplified. The optical path in a Treacy compressor is relatively long and is mostly through air. The refractive index of air may seem negligible, but it can vary the operating wavelength of the system from that of a vacuum by ~0.5 nm at ~1550 nm. The refractive index of air varies with temperature, pressure, and relative humidity, so changes in environment can affect system performance. The dispersion of various other components in a CPA system may also vary with environmental conditions, such as Bragg fiber and fiber Bragg gratings (FBGs). The refractive index of system components can vary with pulse intensity via optical nonlinear processes, which can also induce optical phase variations similar to dispersion and ultimately effect pulse duration.

The manufacturing tolerances of some components, such as Bragg fiber and FBGs, can result in a wide variation in the dispersive properties of different fibers. It is also impractical to fine tune the dispersion of each laser system in a mass manufacturing environment, since the output of each system must be measured and then its dispersion must be fine tuned.

SUMMARY

Actively tunable dispersion compensators, or tuning elements, are incorporated into a chirped pulse amplification (CPA) system to control the net amount of group velocity dispersion in the system. In some embodiments, the tuning elements are used to decrease the temporal width of the output pulse. In some embodiments, the CPA system includes Bragg fibers configured to stretch and compress an optical pulse. In these embodiments, the tuning elements may be used to overcome difficulties associated with matching the dispersion of the Bragg fibers and/or the other elements of the system in order to control the net dispersion experienced by a pulse as it propagates through the system. In further embodiments, the tuning elements are configurable to tune higher-order dispersions, such as dispersion slope and quadratic dispersion, or to account for phase shifts in the pulse caused by nonlinear optical effects.

In some embodiments, the tuning elements include tunable fiber Bragg gratings. The fiber Bragg gratings are configured to stretch or compress the optical pulse duration by varying degrees and, thus, tune the overall dispersion of the CPA system. The fiber Bragg gratings are tuned, for example, by placing them in varying thermal or strain gradients. A thermal gradient can be actively controlled, for example, by resistively heating a metal film deposited at various thicknesses along the length of the fiber. A strain gradient can be controlled, for example, by placing the fiber Bragg grating across the neutral axis of a physical beam subject to a four-point bend and having a variable force applied to it. Further embodiments include a fiber Bragg grating constructed using photorefractive and photosensitive materials with specific optical characteristics. In these embodiments, tuning is performed by activating these materials using actinic radiation.

In alternative embodiments, the tuning elements include a tunable Bragg fiber. For example, a Bragg fiber may be tuned by thermally heating the fiber by applying current to a metal film deposited on the Bragg fiber to resistively heat the Bragg fiber. In another example, a Bragg fiber is tuned by applying strain along the length of the fiber by either compressing or stretching the fiber, thus changing the thickness of the bi-layers that comprise the Bragg fiber. In alternative embodiments, the Bragg fiber is tuned by placing the fiber in varying thermal or strain gradients in configurations such as those used for tuning fiber Bragg gratings.

Further embodiments include a Bragg fiber constructed using photorefractive or photosensitive materials and dispersion tuning is performed by activating these materials using actinic radiation. When these materials are irradiated, their refractive index changes, this shifts the wavelength of the band gap profile, and thus changes the dispersion of the fiber at a given wavelength. As the Bragg fiber is tuned, light received by the Bragg fiber is chromatically dispersed by varying amounts.

In alternative embodiments, the tuning element includes a modulator configured to control the amplitude and/or phase of the propagating light. The modulator is used to alter the phase profile of an optical signal prior to amplification to counteract the effects of upstream or downstream optical dispersions on the propagating signal. Typically, the modulator is configured to alter the optical signal prior to compression. For example, in some embodiments, an optical modulator such as a dual-parallel Mach-Zehnder modulator is configured to stretch the optical pulse and/or to pre-distort the pulses to compensate for dispersion in the CPA system.

Tuning is optionally performed periodically and/or in real-time in response to a signal received by the tuning element from a pulse monitor.

DETAILED DESCRIPTION

Figure 1:
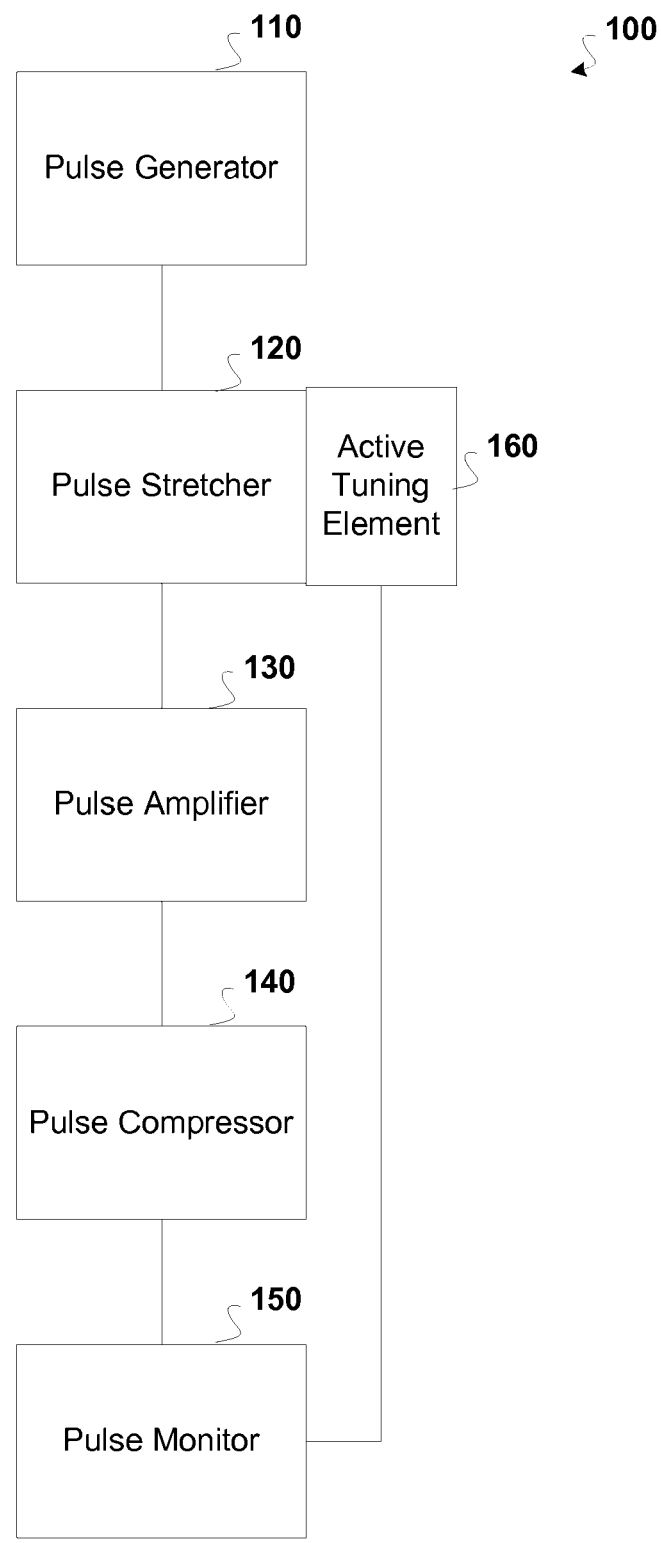
FIG. 1 is a block diagram illustrating a system wherein a pulse stretcher is configured as an active tuning element, according to various embodiments of the invention.

An active tuning element is incorporated into a chirped pulse amplification system in order to control the overall group velocity dispersion of the system. Control of the overall dispersion enables optimization of a system output pulse. The output pulse is optimized to have specified optical characteristics (e.g. pulse width) at an output of the system and/or at a target surface where the output pulse is delivered.

Some embodiments include a CPA system comprising Bragg fibers or fiber Bragg gratings configured to change the temporal dispersion of a laser pulse. A fiber Bragg grating comprises a fiber having a number of spaced regions of variable refractive index along its length. In contrast, a Bragg fiber comprises a fiber having a number of concentric layers with varying indices of refraction, see, e.g., U.S. patent application Ser. No. 11/112,256, which is hereby incorporated herein by reference. These components can be used to increase or decrease the temporal dispersion of the CPA system.

At least two types of active tuning elements are within the scope of the invention. A first type is configured to control the dispersion of an existing element within the CPA system. For example, an active tuning element of the first type may be used to control the dispersion of an optical fiber, such as a Bragg fiber, within a pulse stretcher or pulse compressor. The dispersion of an optical fiber may be altered by changing refractive index properties of the optical fiber. Methods of changing these refractive index properties are discussed further herein. The dispersion of the Bragg fiber may also be changed by physically stretching or compressing it longitudinally.

A second type of active tuning element is included as an additional dispersive element within the CPA system. For example, an additional dispersive element may be inserted between a pulse stretcher and a pulse amplifier in order to control the net dispersion of the system or its effect on the system. In certain embodiments, the addition of a separate active tuning element is configured to compensate for any mismatch between the temporal dispersion caused by a pulse stretcher and the temporal dispersion caused by a pulse compressor. In some embodiments, a separate active tuning element is configured to compensate for dispersion of other system elements (e.g. an amplifier, a delivery fiber, elements having an air gap where an optical path length varies by environmental fluctuations, or an air gap between a system output and a target surface). The active tuning element is optionally a modulator, a fiber Bragg grating, a bulk grating pair, a Bragg fiber, or the like. In some embodiments, the added active tuning element is an element having lower but more accurately controlled dispersion properties relative to other elements within the system.

Some embodiments further comprise a pulse monitor configured to measure one or more characteristics of the output of the CPA system, these characteristics can include pulse energy, flux, average power, the temporal width, or the like. The pulse monitor is disposed, for example, at a system output or at a target surface. The pulse monitor is typically configured to supply feedback to the active tuning element to control the dispersion in the system in real-time as output pulses are generated. This pulse monitor could be as simple as a photodetector fabricated from a material with a bandgap larger than the energy of a single photon, e.g. a silicon photodetector used to monitor light at ~1550 nm. In this particular case, a multi-photon event is needed to create an appreciable signal in the detector and thus this signal strength is related to pulse peak power and pulse duration. In other embodiments, the pulse detector may be an optical pulse correlator, a frequency-resolved optical gating (FROG) system, a cross-correlator, a gated pulse analyzer, and/or the like.

In some embodiments, a Bragg fiber is configured to stretch or compress an optical pulse. Due to manufacturing variations, different Bragg fibers may contribute various different amounts of temporal dispersion when included in a CPA system. It is, therefore, useful to include additional fine-tuning in CPA systems that include Bragg fibers in order to optimize system output. Some embodiments, therefore, include an active-tuning element configured to provide this additional tuning. In some embodiments, this active tuning element is associated with and configured to change dispersion properties of the Bragg fiber. In other embodiments, this active tuning element is part of an additional dispersive element within the CPA system, configured to compensate for unwanted dispersive properties of the Bragg fiber.

FIG. 1 illustrates a pulse generation system 100 configured to generate a short laser pulse. Pulse generation system 100 includes a pulse generator 110 configured to generate a seed pulse, and a pulse stretcher 120, a pulse amplifier 130 and a pulse compressor 140. Pulse generation system 100 further includes a pulse monitor 150 and an active tuning element 160 configured to dynamically optimize the output of pulse generation system 100.

Pulse generator 110 is configured to generate a seed pulse having a certain duration, and optical amplitude and phase profile. In various embodiments, pulse generator 110 comprises, for example, a ring laser, a laser oscillator, a chirped pulse source, a quasi-continuous wave laser, or the like.

Pulse stretcher 120 is configured to increase the temporal duration of the seed pulse. In the embodiments illustrated in FIG. 1, pulse stretcher 120 is coupled to an active tuning element 160 configured to control the temporal dispersion of the pulse stretcher. Some embodiments of the pulse stretcher 120 include acousto-optic dispersive filters or tunable filters. In other embodiments, pulse stretcher 120 is a fiber Bragg grating or Bragg fiber subject to a varying thermal or strain gradient applied by active tuning element 160 to change the refraction index properties of the optical fiber.

A strain gradient is applied to the fiber Bragg grating or Bragg fiber, for example, by placing the fiber Bragg grating or Bragg fiber across a neutral axis of a physical beam subject to a four-point bend. For example, in one embodiment, the strain gradient is applied to a fiber Bragg grating as described in U.S. Pat. No. 5,694,501 by Alavie, et al. The strain gradient is then actively controlled by varying the force applied to the physical beam. As the strain along the physical beam varies linearly along the width of the beam, the beam will exert a linear strain along the length of the fiber Bragg grating or Bragg fiber that is attached across the width of the beam. The linear strain stretches or compresses the space between the gratings in the fiber Bragg grating or the space between layers in a Bragg fiber, varying the dispersion characteristics of the fiber Bragg grating or Bragg fiber. As the dispersion of the pulse stretcher is controlled by changing the strain applied to the physical beam, the net dispersion of the system is also controlled. The applied strain can, thus, be used to optimize the net dispersion of the system.

In alternative embodiments, a thermal gradient is applied by the active tuning element 160 along a length of the fiber Bragg grating or Bragg fiber configured to stretch the laser pulse. For example, to apply the thermal gradient, a metal film having a thickness varying linearly may be deposited around the circumference of the Bragg fiber or fiber Bragg grating along part of the optical fiber length. For example, in one embodiment, the metal film is deposited as described by Eggleton et al., "Electrically Tunable Power Efficient Dispersion Compensating Fiber Bragg Grating," Photonics Technology Letters 11(7), pages 854-856, July 1999. An electrical current is passed through the film to resistively heat the film and, thus, heat the fiber Bragg grating or Bragg fiber to alter the refractive index of the fiber materials comprising the fiber Bragg grating or Bragg fiber. As the refractive index changes, so does the dispersion of the fiber Bragg grating or Bragg fiber, and of the pulse stretcher 120. In these embodiments, the temporal dispersion of the pulse stretcher 120, and thus the CPA system 100, is changed by controlling the current passed through the metal film coating the fiber Bragg grating or Bragg fibers.

In other embodiments, pulse stretcher 120 comprises a Bragg fiber or fiber Bragg grating constructed using photorefractive and photosensitive materials wherein the presence or absence of actinic radiation changes the refractive index of the materials. In these embodiments, the active tuning element 160 is configured to provide actinic radiation. As regions of the Bragg fiber or fiber Bragg grating are illuminated by the actinic radiation, the optical characteristics, including the refractive index of the Bragg fiber or fiber Bragg grating, change. The temporal dispersion of the pulse stretcher 120 is changed controllably by the presence or absence of actinic radiation.

In the embodiments of pulse stretcher 120 comprising a Bragg fiber, the active tuning element 160 is optionally configured to tune the Bragg fiber section by section using a combination of one or more of the techniques described herein. An applied temperature or strain gradient or applied actinic radiation tunes each portion along the length of the Bragg fiber as described herein.

Amplifier 130 is configured to add energy to the stretched pulse. In some embodiments, the amplifier 130 is a fiber-amplifier pumped by pump diodes. In other embodiments, the amplifier 130 is a semiconductor optical amplifier. In some embodiments, the CPA system comprises more than one amplifier. In other embodiments, the amplifier 130 is a solid state optical amplifier, such as Nd:YAG or Yb:YAG.

Pulse compressor 140 is configured to temporally compress the amplified pulse. In some embodiments, pulse compressor 140 comprises an air-path between bulk optic gratings as a Treacy compressor. In other embodiments, the amplified pulse is compressed using a fiber Bragg grating or a Bragg fiber. Tuning the pulse compressor in the CPA system is discussed further elsewhere herein, for example in the description of the various embodiments shown in FIG. 2.

Pulse monitor 150 is configured to measure characteristics of the output pulse. In various embodiments, these characteristics include the temporal width of the output pulse and the energy of the output pulse to determine the peak power of the output pulse. In some embodiments, the pulse monitor 150 is disposed near the output of the pulse compressor 140. In other embodiments, pulse monitor 150 is disposed at an intermediate point between the output of the pulse compressor 140 and a target surface, such as in a catheter. In still other embodiments, the pulse monitor 150 is disposed at the target surface where the output pulse is delivered.

The pulse monitor 150 is configured to deliver feedback to the active tuning element 160 to adjust, for example, the current passed through heating wires coupled to a fiber Bragg grating or a Bragg fiber, the force applied to a physical beam coupled to a fiber Bragg grating or a Bragg fiber, or the amount of actinic radiation applied to a Bragg fiber, thereby tuning the dispersion of the CPA system as described above. In some embodiments, the pulse monitor 150 is further configured to tune the dispersion of the system to optimize an output pulse at a target surface after the output pulse is passed through an additional component (not shown), such as catheter or an air gap, wherein the additional component further alters the temporal width of the pulse.

Figure 2:
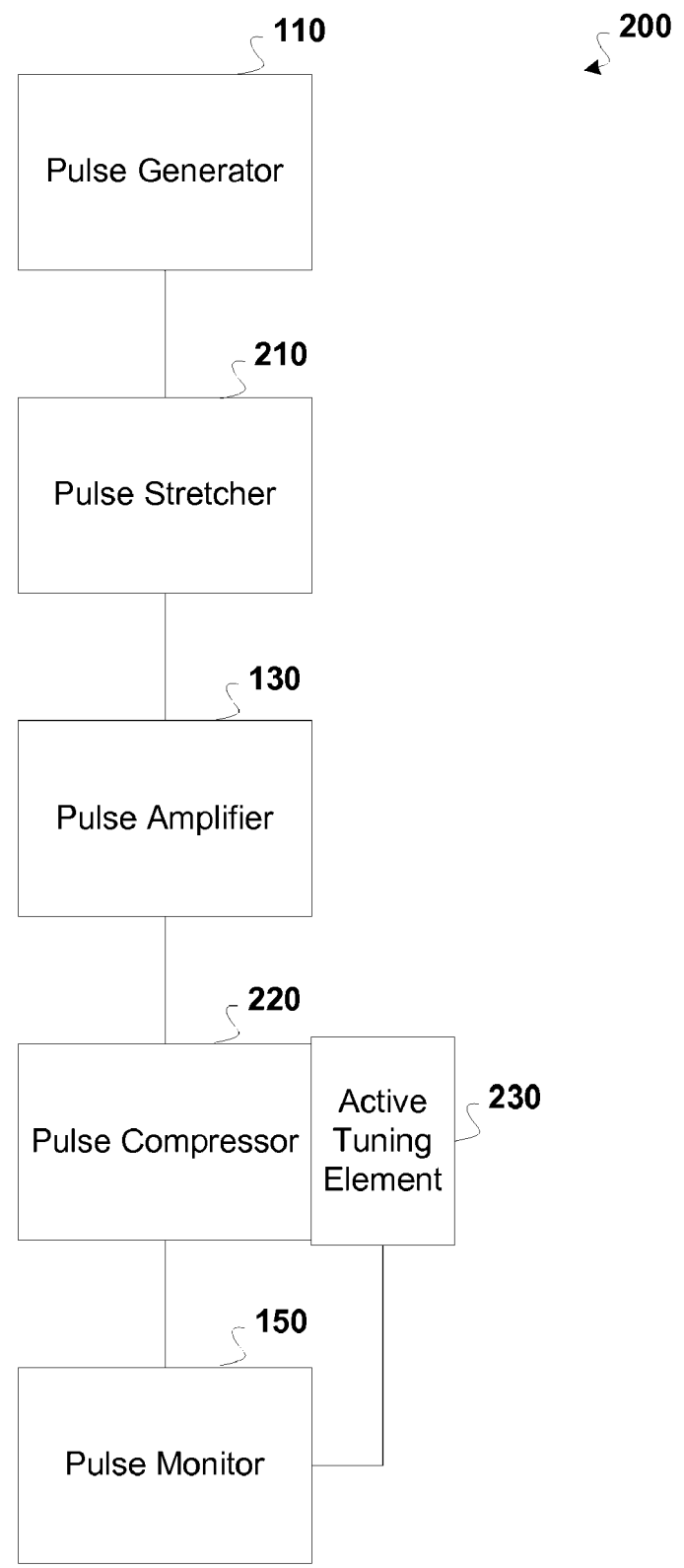
FIG. 2 is a block diagram illustrating a system wherein a pulse compressor is configured as an active tuning element, according to various embodiments of the invention.

FIG. 2 illustrates a pulse generation system 200 configured to generate a short laser pulse. Pulse generation system 200 includes a pulse generator 110 configured to generate a seed pulse as described herein, a pulse stretcher 210, a pulse amplifier 130 configured to amplify the seed pulse as described herein, and a pulse compressor 220. Pulse generation system 200 further includes a pulse monitor 150 as described herein configured to provide feedback to an active tuning element 230 configured to dynamically control the output of pulse generation system 200. In these embodiments, the pulse generator 110, the pulse amplifier 130, and the pulse monitor 150 are comparable to the components in other embodiments described herein.

The pulse stretcher 210 is configured to increase the temporal width of the seed pulse. The pulse stretcher 210 may comprise a Bragg fiber, a fiber Bragg grating, or the like. In some embodiments, pulse stretcher 210 further comprises an active tuning element as described herein.

The pulse compressor 220 is configured to decrease the temporal width of the seed pulse after it has been amplified. The pulse compressor 220 may comprise a Bragg fiber, a fiber Bragg grating or an air-path between bulk optic gratings configured as a Treacy compressor.

For those embodiments illustrated in FIG. 2, the active tuning element 230 is configured to change the temporal dispersion contributed to the CPA system by the pulse compressor 220. In some embodiments, the active tuning element 230 is configured to apply a strain gradient or a thermal gradient to the Bragg fiber or fiber Bragg grating as described herein. In other embodiments, the active tuning element 230 can also be configured to apply actinic radiation to the Bragg fiber or fiber Bragg grating as described herein.

Figure 3:
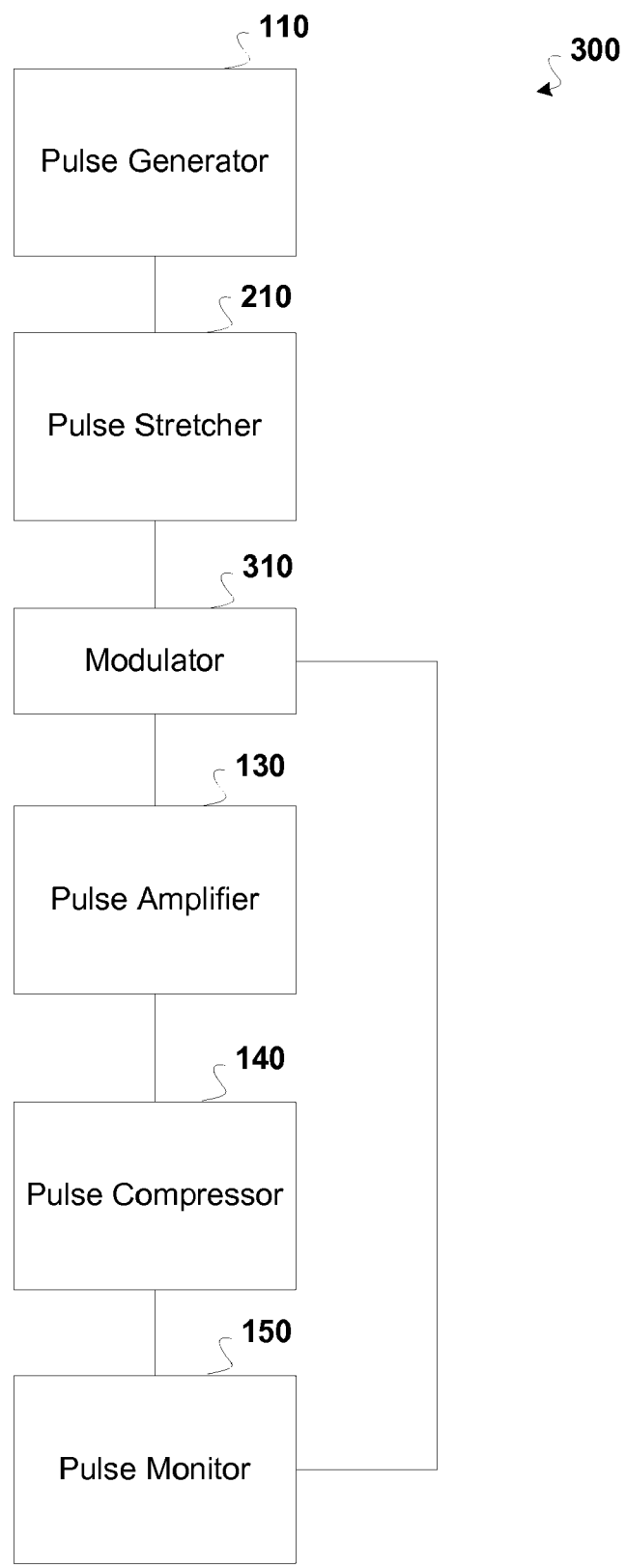
FIG. 3 is a block diagram illustrating a system further comprising a modulator configured as an active tuning element, according to various embodiments of the invention.

FIG. 3 illustrates a pulse generation system 300 configured to generate a short laser pulse. Pulse generation system 300 includes a pulse generator 110 configured to generate a seed pulse as described herein, a pulse stretcher 210 as described herein, an optical amplitude and/or phase modulator 310 configured to dynamically optimize the output of pulse generation system 200, a pulse amplifier 130 configured to amplify the seed pulse as described herein, and a pulse compressor 140 as described herein. Pulse generation system 300 further includes a pulse monitor 150 as described herein. The pulse generator 110, the pulse stretcher 210, the pulse amplifier 130, the pulse compressor 140, and the pulse monitor 150 are comparable to the components in other embodiments as described herein. In some embodiments, the pulse compressor 140 comprises a Treacy compressor.

The modulator 310 is configured to control the amplitude and/or phase along the stretched optical pulse to compensate for first and higher-order dispersions. The modulator 310 is used to alter the phase profile of an optical signal prior to amplification to counteract the effects of upstream or downstream optical dispersions on the propagating signal. In some cases, the modulator 310 may be configured to alter the phase of the optical signal to compensate for first, second, third, and/or higher orders of dispersion. For example, in one embodiment, adding a phase modulator is a form of signal pre-distortion to account for the undesired residual dispersions and optical nonlinearities in the system. Others have used a similar technique to optimize the received signal in optical fiber communications to pre-distort signals before they propagate through many kilometers of optical fiber, for example, Hellstrom, et al., "Third Order Dispersion Compensation Using a Phase Modulator," Journal of Lightwave Technology vol. 20 no. 5, pages 1188-1197, May 2003. The functional form of a signal used to drive the modulator may be a cubic, quadratic, sine, or cosine function, or other desired function to control the dispersion of the output signal or the spectral width of an output signal. In some embodiments, the modulator 310 is used to approximate a Cartesian electric-to-optical convertor, such as a dual-parallel Mach-Zehnder modulator, to perform arbitrary E-field modulation. In various embodiments, modulator 310 may comprise a dual-drive Mach-Zehnder modulator, a Lithium-Niobate device, liquid crystals, or the like.

A Mach-Zehnder modulator may be used, for example, to compensate for temporal spreading of the pulse caused by the light intensity of the optical pulse (self-phase modulation), mismatched Bragg fibers, environmental effects and dispersion sources described herein. In some of these embodiments, the Mach-Zehnder modulator is also configured to increase the temporal dispersion of the system, by acting as part of the pulse stretcher 210. To illustrate, one embodiment of the CPA system comprises a pulse generator 110 coupled to a Mach-Zehnder modulator which is coupled to a pulse amplifier 130. The pulse amplifier 130 is, in turn, coupled to a pulse compressor 140. The Mach-Zehnder modulator is an extra element that adds a form of pre-distortion; pre-distortion in a different context is described in, for example, Killey, et al., "Electronic Dispersion Compensation by Signal Pre-Distortion Using Digital Processing and a Dual-Drive Mach-Zehnder Modulator," Photonics Technology Letters 17(3), pages 714-716, March 2005.

In some embodiments, a modulator 310 is configured to account for phase distortions due to optical non-linearities in the system. A characteristic of this type of dispersion during amplification is the broadening or narrowing of an optical spectrum within a stretched pulse. This may result in pulse distortion and/or a loss of energy to spectral sidebands, the magnitude of which depends on a sign and magnitude of the initial pulse chirp entering the non-linear media. See, for example, Nibbering, et al., "Spectral Determination of the Amplitude and the Phase of Intense Ultrashort Optical Pulses," J. Opt. Soc. Am. B vol. 13 no. 2, pages 317-329, February 1996, demonstrating in a different context how isolated changes to the quadratic and cubic phase of a pulse can produce drastically different output spectra. Further, in other types of systems, it has been shown that net third order dispersion can be balanced by a non-linear chirp accumulated during amplification in an ytterbium fiber gain system. See, e.g., Zhou, et al., "Compensation of Nonlinear Phase Shifts with Third-Order Dispersion in Short-Pulse Fiber Amplifiers," Optics Express vol. 13 no. 13, pages 4869-4877, Jun. 27, 2005.

Figure 4:
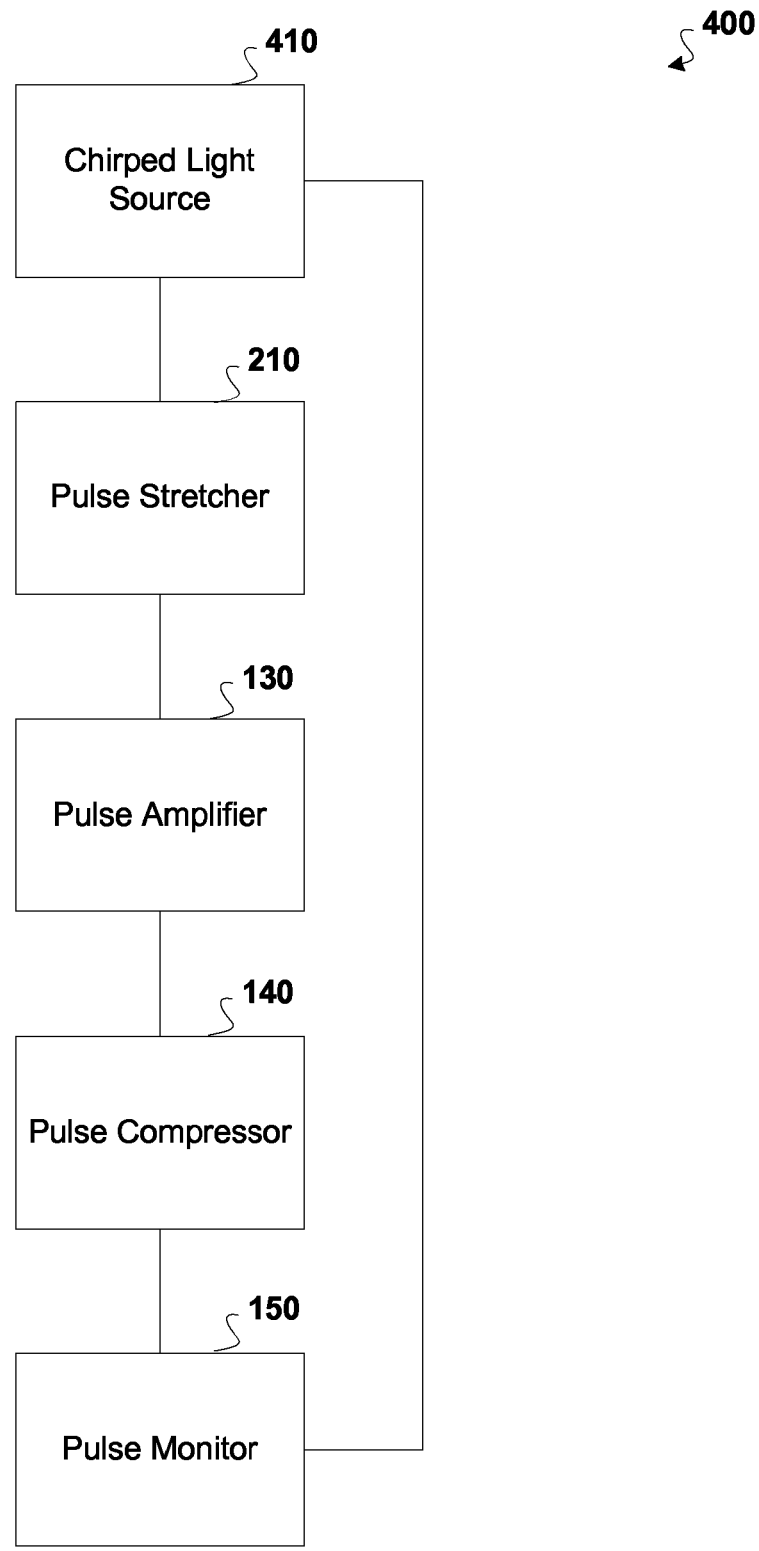
FIG. 4 is a block diagram illustrating a system further comprising a chirped light source configured as an active tuning element, according to various embodiments of the invention.

FIG. 4 illustrates a pulse generation system 400 configured to generate a short laser pulse. Pulse generation system 400 includes a chirped light source 410 configured to generate a chirped seed pulse, a pulse stretcher 210, a pulse amplifier 130 configured to amplify the seed pulse as described herein, and a pulse compressor 140. Pulse generation system 400 further includes a pulse monitor 150 as described herein. The pulse stretcher 210, the pulse amplifier 130, the pulse compressor 140 and the pulse monitor 150 are comparable to the components described in the embodiments herein. In various embodiments, the chirped light source 410 comprises a Distributed Bragg Reflector (DBR) laser. In alternative embodiments, a chirped pulse is created by sculpting a pulse from a continuous-amplitude frequency-modulated source by using a Mach-Zehnder modulator.

In some embodiments, chirped light source 410 comprises a DBR laser. In this instance, a constant amplitude signal is frequency modulated to create a desired chirped signal. The phase profile of the DBR laser output is modified to match the dispersion in the rest of the pulse generation system 400. In one embodiment, the DBR laser is tuned, for example, as disclosed in U.S. Pat. No. 6,834,134 by Brennan, III, et al., which is hereby incorporated herein by reference. The dispersion of 410, for example, is tunable to match the dispersion of other components such as the pulse stretcher 210 or the pulse compressor 140, the dispersion caused by environmental effects, or the dispersion introduced due to the intensity of the light pulse. In some embodiments, the DBR laser is configured to also increase or decrease the temporal dispersion of the chirped seed pulse. In these embodiments, as the DBR laser stretches the light pulse, the pulse generation system 400 may not include a pulse stretcher 210.

Figure 5:
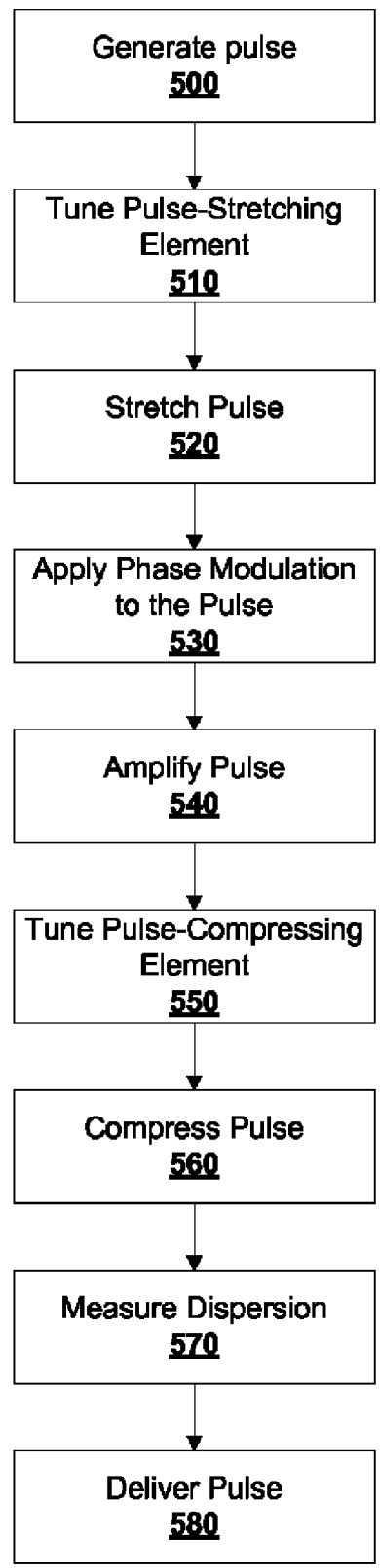
FIG. 5 is a flowchart illustrating a method included in various embodiments of the invention.

The flowchart in FIG. 5 illustrates a method used in some embodiments to generate an output pulse. First, a Step 500 includes generating a pulse using a pulse generator 110 or chirped pulse source 410 as described herein. Second, an optional step 510 includes tuning a pulse-stretching element, such as pulse stretcher 120 using an active tuning element, such as active tuning element 160. Third, a step 520 includes stretching the pulse using, e.g. pulse stretcher 120 or pulse stretcher 210. Fourth, an optional step 530 includes applying amplitude and/or phase modulation to the stretched pulse using, e.g. modulator 310. Fifth, a step 540 includes amplifying the pulse using, e.g. pulse amplifier 130. Sixth, an optional step 550 includes tuning a pulse-compressing element such as active tuning element 230. Seventh, a step 560 includes compressing the pulse using, e.g. pulse compressor 140 or pulse compressor 220. Eighth, a step 570 includes measuring the dispersion and/or pulse intensity of the output pulse as described herein using, e.g. pulse monitor 150. Ninth, a step 580 includes delivering the pulse to a target surface. The order of steps 570 and 580 is optionally reversed such that the pulse is first delivered then measured. At least one of the optional tuning steps, e.g. 510, 530, or 550, is used in typical embodiments of the invention.

In various embodiments at least one of these optional tuning steps is performed during the operation of the CPA system. In some embodiments, the tuning step is performed periodically. In some embodiments, the tuning step is performed in real-time.

The optimization performed using active tuning can be directed toward a variety of different operational parameters. For example, tuning the CPA system such that the output pulse delivers a specified amount of power to a target surface. In various embodiments, the net dispersion of the system is optimized to control the temporal width of an output pulse, and/or control the fluence of a pulse while maintaining approximately the average pulse energy. In these embodiments, the output pulse may be optimized to ablate a material at a target surface.

Several embodiments are specifically illustrated and/or described herein. However, it will be appreciated that modifications and variations are covered by the above teachings and within the scope of the appended claims without departing from the spirit and intended scope thereof. For example, in some embodiments, Pulse Monitor 150 may be placed elsewhere in the system to provide feedback, e.g., before the pulse is compressed or phase modulated. In other embodiments, the system and method described herein may be used to measure or tweak another characteristic of the pulse, such as a spatial width. In still other embodiments, a pulse monitor further comprises a processor capable of receiving user inputs. In alternative embodiments, photonic crystal or other microstructured fibers may substitute for the Bragg fibers.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A chirped pulse amplification system, comprising:
   a pulse generator, configured to generate a laser pulse;
   a pulse stretcher, configured to generate a stretched pulse from the laser pulse by dispersing it temporally as a function of wavelength;
   a pulse amplifier, configured to generate an amplified pulse from the stretched pulse; and
   a pulse compressor comprising a Bragg fiber, configured to generate a compressed pulse from the amplified pulse, wherein the pulse stretcher or the pulse compressor is tunable to control a total group velocity dispersion of the chirped pulsed amplification system.

2. The system of claim 1, wherein the pulse stretcher comprises a fiber Bragg grating.

3. The system of claim 1, wherein the pulse stretcher comprises a dispersion compensating fiber.

4. The system of claim 1, wherein the pulse stretcher comprises a Bragg fiber.

5. The system of claim 1, wherein the pulse stretcher or the pulse compressor further comprises a physical beam configured to apply strain to the pulse stretcher or the pulse compressor.

6. The system of claim 1, wherein the pulse stretcher or the pulse compressor further comprises a heater configured to control dispersion of the pulse stretcher or the pulse compressor.

7. A method, comprising the steps of:
   generating a laser pulse;
   amplifying the laser pulse using an optical amplifier, to produce an amplified pulse;
   compressing the amplified pulse using a pulse compressor comprising a Bragg fiber, to produce a compressed pulse;
   measuring a temporal width of the compressed pulse; and
   dynamically tuning total group velocity dispersion of the system to control a temporal width of the compressed pulse responsive to the measured temporal width.

8. The method of claim 7, wherein the generated laser pulse is a chirped pulse.

9. The method of claim 7, wherein the step of dynamically tuning controls at least dispersion and dispersion slope.

10. The method of claim 7, wherein measuring the temporal width of the compressed pulse includes using a power meter or correlator to determine the temporal width of the compressed pulse at a surface where the compressed pulse is delivered.

11. The method of claim 7, wherein the total temporal dispersion is caused by a free-space element, environmental effects, or pulse intensity.

12. The method of claim 7, wherein the step of dynamically tuning is performed using a modulator.

13. The method of claim 7, wherein the step of dynamically tuning is performed using a strain gradient applied to a fiber Bragg grating.

14. The method of claim 7, wherein the step of dynamically tuning is performed using a heat gradient applied to a fiber Bragg grating.

15. The method of claim 7, wherein the step of dynamically tuning is performed by applying heat to a Bragg fiber.

16. The method of claim 7, wherein the step of dynamically tuning is performed by applying strain along a length of a Bragg fiber.

17. The method of claim 7, wherein the step of dynamically tuning is performed using a Bragg fiber or a fiber Bragg grating constructed using photosensitive or photorefractive materials activated by actinic radiation.

18. The method of claim 7, wherein the step of dynamically tuning is performed responsive to the measured temporal width of the compressed pulse in real-time.

19. The method of claim 7, wherein the step of dynamically tuning is performed using a distributed Bragg reflector laser.

20. The method of claim 7, further comprising stretching the laser pulse using a pulse stretcher, to produce a stretched pulse.

21. The method of claim 20, wherein temporal dispersion resulting from the pulse stretcher is tuned to match temporal dispersion resulting from the pulse compressor.

22. The method of claim 20, wherein the step of stretching the laser pulse and the step of dynamically tuning are performed using a Mach-Zehnder modulator.

23. The method of claim 20, wherein the step of stretching the laser pulse is performed using a fiber Bragg grating and the step of compressing the amplified pulse is performed using a Bragg fiber.

24. The method of claim 20, wherein the step of stretching the laser pulse is performed using a dispersion compensating fiber.

25. The method of claim 20, wherein the step of stretching the laser pulse is performed using a Bragg fiber.

26. The method of claim 20, wherein the step of stretching the pulse is performed by changing a chirp of an optical pulse by controlling optical non-linearities through control of pulse intensity.

27. The method of claim 20, wherein the step of stretching the pulse is performed using acousto-optic components including acousto-optic dispersive filters or tunable filters.

28. A system, comprising:
   a chirped pulse source configured to generate a chirped pulse;
   an amplifier configured to generate an amplified pulse from the chirped pulse;
   a compressor configured to generate a compressed pulse from the amplified pulse, the compressor comprising a Bragg fiber;
   an active tuning element configured to tune a temporal dispersion of the system and control a temporal width of the compressed pulse; and
   a pulse monitor configured to measure one or more characteristics of the compressed pulse, the active tuning element being responsive to an output of the pulse monitor.

* * * * *